(12) United States Patent
Erdmann et al.

(10) Patent No.: US 8,364,811 B1
(45) Date of Patent: Jan. 29, 2013

(54) DETECTING MALWARE

(75) Inventors: David Erdmann, Edmonds, WA (US);
Karl A. McCabe, Dublin (IE); Jon A. McClintock, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 230 days.

(21) Appl. No.: 12/827,478

(22) Filed: Jun. 30, 2010

(51) Int. Cl.
*G06F 15/173* (2006.01)
*G06F 15/16* (2006.01)
*G06F 11/00* (2006.01)

(52) U.S. Cl. ........ 709/224; 709/223; 709/225; 709/218; 709/206; 706/26; 706/23; 706/24; 706/25; 713/340; 713/375

(58) Field of Classification Search .................. 709/224, 709/225, 247
See application file for complete search history.

(56) References Cited

U.S. PATENT DOCUMENTS

| | | | |
|---|---|---|---|
| 7,506,056 B2* | 3/2009 | Satish et al. | 709/225 |
| 8,095,964 B1* | 1/2012 | Zhong et al. | 726/4 |
| 8,220,054 B1* | 7/2012 | Lu | 726/24 |
| 2005/0223001 A1* | 10/2005 | Kester et al. | 707/6 |
| 2006/0004636 A1* | 1/2006 | Kester et al. | 705/22 |
| 2007/0016951 A1* | 1/2007 | Piccard et al. | 726/24 |
| 2007/0174915 A1* | 7/2007 | Gribble et al. | 726/24 |
| 2009/0077383 A1* | 3/2009 | de Monseignat et al. | 713/175 |
| 2009/0113547 A1* | 4/2009 | Higashikado | 726/23 |

* cited by examiner

*Primary Examiner* — Jude Jean Gilles
(74) *Attorney, Agent, or Firm* — Thomas ═ Horstemeyer, LLP

(57) ABSTRACT

Disclosed are various embodiments for determining a source of malware. At least one embodiment of a method includes receiving browsing data from a plurality of client devices, the data being sent by the plurality of client devices, in response to a determination of malware on the plurality of client devices and determining, from the browsing data, a source for the malware. Further, some embodiments include determining whether the source for the malware is associated with a predetermined network site and in response to determining that the source of the malware is associated with a predetermined network site, preventing download of at least a portion of the predetermined network site.

20 Claims, 8 Drawing Sheets

DETECTING MALWARE

BACKGROUND

In the online retail market, retailers will often offer products from one or more manufacturers. Additionally, some online retailers may employ other vendors, such as advertisers, to provide goods and/or services to the online retailer. As a nonlimiting example, if a vendor wishes to place an advertisement on the network site of the online retailer (or otherwise conduct business with the online retailer), the vendor may contact the online retailer for this purpose. While the use of such vendors may generate additional revenue and/or provide additional goods and/or services for the online retailer, the online retailer or customer of the online retailer may be at risk for malware or other nefarious activity by the vendor. Such nefarious activity may reflect poorly on the online retailer, may damage network infrastructure of the online retailer, and/or may otherwise be detrimental to those associated with the online retailer.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Included are embodiments for detecting malware on a user system. As a nonlimiting example, when a user browses the Internet, he/she may encounter network pages that automatically detect malware. While the presence of malware on the user system may be detected by a security application, a network intrusion application may report the malware, as well as browsing (and/or other) data, to a remote computing device. By receiving the browsing data (and/or other data, such as local usage data, which may include data related to emails, instant messages, word processing, and/or other local programs executed on the user device) from the user system, a network intrusion detection application at the remote computing system may compare the browsing (and/or other) data with data from other user systems to determine the source of the malware. If the remote computing device determines that the source of the malware is associated with a predetermined network site (such as an advertisement provided to an online retailer), the computing device can facilitate prevention of the source of malware from being presented by the network site. Additionally, in some embodiments, the user system may be informed of the source of the malware, how to remove the malware, and/or how to prevent future malware from being loaded onto the user system. In the following discussion, first the structural makeup of various components is described followed by a discussion of the operation of the same.

Figure 1:
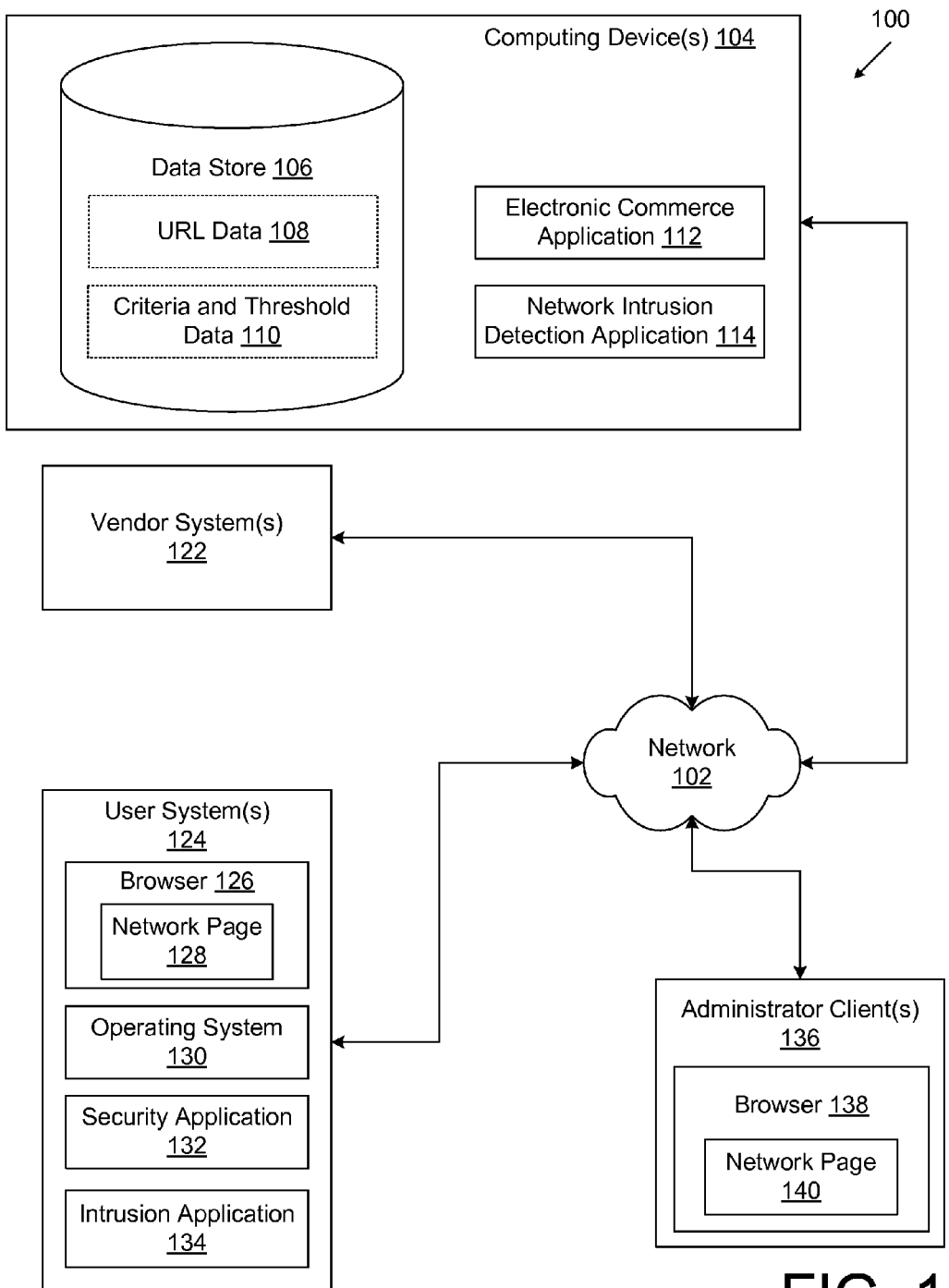
FIG. 1 is a drawing of an example computing environment for implementing a vendor social network, according to various embodiments of the present disclosure.

With reference to FIG. 1, shown is a computing environment 100 according to various embodiments. Among other components, the computing environment 100 may include a network 102, at least one computing device 104, at least one vendor system 122, at least one user system 124, and at least one administrator client 136. The network 102 includes, for example, the Internet, intranets, extranets, wide area networks (WANs), local area networks (LANs), wired networks, wireless networks, or other suitable networks, etc., or any combination of two or more such networks.

The computing device 104 may comprise, for example, a server computer or any other computing device or system providing computing capability. The computing device 104 may represent multiple computer systems arranged, for example, in one or more server banks or other arrangements. To this end, the computing device 104 may comprise, for example, a cloud computing resource, a grid computing resource, and/or any other distributed computing arrangement. Such computer systems may be located in a single installation or may be dispersed among many different geographical locations. In one embodiment, the computing device 104 represents a virtualized computer system executing on one or more physical computing systems. For purposes of convenience, the computing device 104 is referred to herein in the singular. However, in one embodiment, the computing device 104 represents a plurality of computer systems arranged as described above.

Various applications and/or other functionality may be executed in the computing device 104 according to various embodiments. Also, various data is stored in a data store 106 that is accessible to the computing device 104. Such data may include uniform resource locator (URL) data 108, criteria and threshold data 110, and/or other data. The data store 106 may be representative of a plurality of data stores as can be appreciated. The data stored in the data store 106 for example, is associated with the operation of the various applications and/or or functional entities described below.

Additionally, the computing device 104 may include one or more functional components. The components executed on the computing device 104, for example, may include an electronic commerce application 112, a network intrusion detection application 114, and other applications, services, processes, systems, engines, or functionality not discussed in detail herein. The electronic commerce application 112 may be configured to receive sales contact application data from an administrator client 136, a sales client, and/or other entity. Similarly, the network intrusion detection application 114 may be configured to receive browsing data (and/or other data) from a user system 124 to determine a source of malware, as described in more detail below.

The user system 124 is representative of a plurality of client devices that may be coupled to the network 102. The user system 124 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The user system 124 may be configured to execute various applications such as a browser 126, an operating system 130 (including other applications, such as email, word processing, instant messaging, teleconferencing, etc.), a security application 132 from FIG. 1 (including antivirus software, firewall software, adware, etc.), an intrusion application 134, and/or other applications. The browser 126 may be executed in the user system 124, for example, to access and render network pages 128, such as web pages, or other network content served up by the computing device 104 and/or other servers. Similarly, the operating system 130 may be configured to provide a desktop user interface for providing one or more applications to a user. Additionally, included within the operating system 130 are other applications, such as a word processor, email application, instant messaging application, teleconferencing application and/or other applications. While these additional applications may or may not actually be part of the operating system 130 (and/or may be provided by a different entity than the operating system 130), for purposes of simplicity, these applications may be described as being included within the operating system 130.

Additionally, in some embodiments, the user system 124 may include a security application 132. The security application 132 may include antivirus software, firewall software, adware, and/or other logic that may be utilized for detecting malware on the user system 124. Further, while the security application 132 is illustrated in FIG. 1 as being located on the user system 124, the security application 132 may be installed on a router (or other local area network device) and need not always be present on the user system 124.

Similarly, the user system 124 includes an intrusion application 134. The intrusion application 134 may be configured to communicate with the security application 132, such that upon detection of malware on the user system 124, the intrusion application 134 can communication with the security application 132, the browser 126, and/or the operating system 130 to compile data related to when the malware was received, as well as indicate actions the user system 124 was performing at that time (or within a predetermined time before the malware was detected). Additionally, the intrusion application 134 can send the received data to the network intrusion detection application 114 on the computing device 104 for analysis. Similar to the security application 132, the intrusion application 134 may be located on the user system 124 and/or on a local area network device (such as a router, modem, etc.). Further, while the intrusion application 134 may be an independent component, the intrusion application 134 may be a plug-in or other component that is part of the browser 126, security application 132, or operating system 130. Other configurations are also considered and included within the scope of this disclosure.

Also included in the nonlimiting example of FIG. 1 is an administrator client 136. The administrator client 136 may include a sales client or other client that is associated with the computing device 104. Additionally, the administrator client 136 may include a browser 138, which may be configured to render a network page 140.

Additionally included in the nonlimiting example of FIG. 1 is the electronic commerce application 112. The electronic commerce application 112 is executed in order to facilitate the online purchase of items over the network 102. The electronic commerce application 112 also performs various back-end functions associated with the online presence of a merchant in order to facilitate the online purchase of items, as will be described. For example, the electronic commerce application 112 generates network pages, such as web pages or other types of network content, that are provided to the administrator client 136 for the purposes of selecting items for purchase, rental, download, lease, or other form of consumption and to perform other functions, as will be described.

Figure 2:
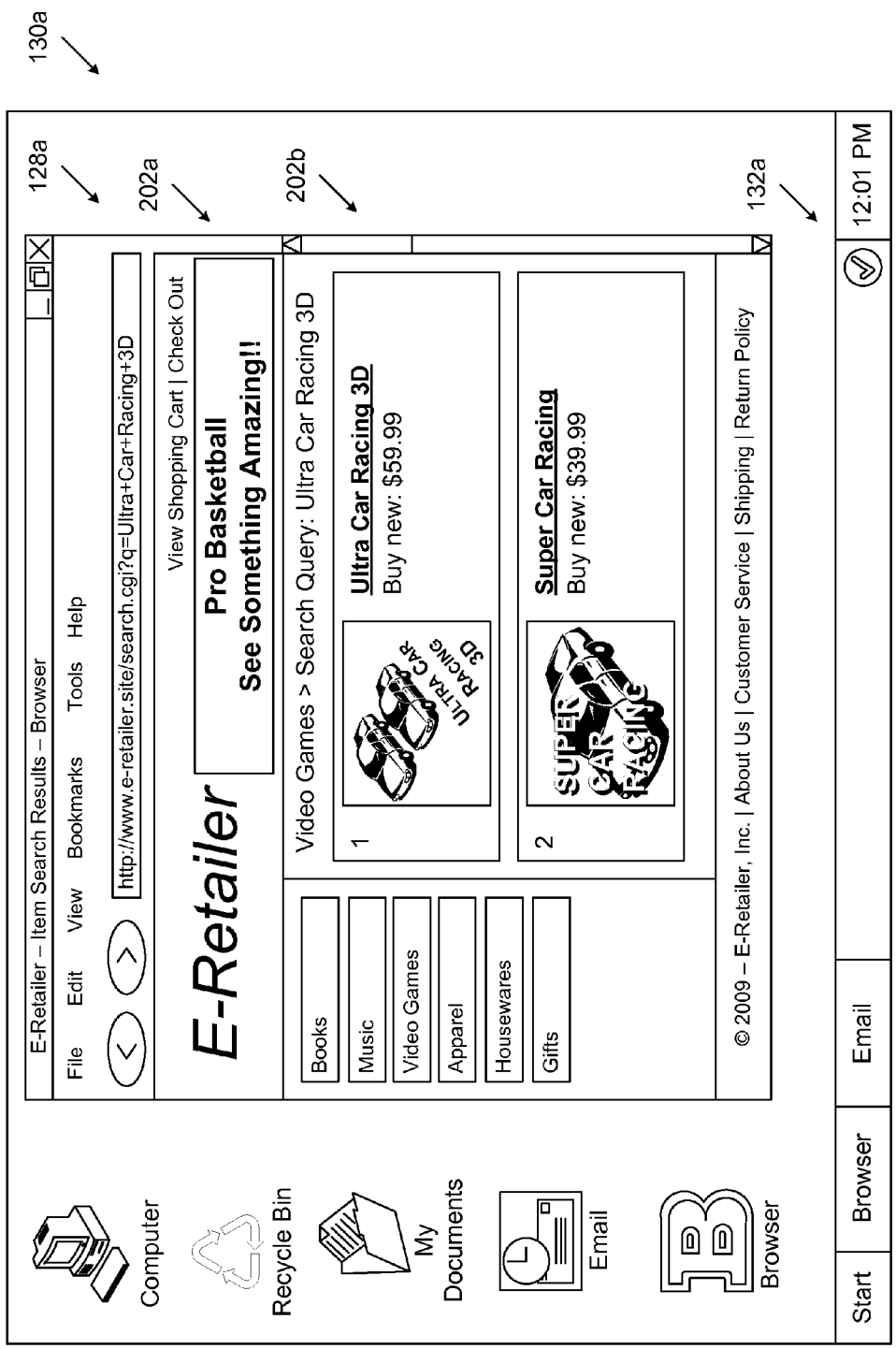
FIG. 2 is a drawing of an example of a user interface rendered by a user system, such as the user system in the environment of FIG. 1, according to various embodiments of the present disclosure.

FIG. 2 is a drawing of an example of a user interface rendered by a user system, such as the user system 124 in the computing environment 100 of FIG. 1, according to various embodiments of the present disclosure. As illustrated in the nonlimiting example of FIG. 2, the user system 124 (via the operating system 130 from FIG. 1) can render a desktop interface 130a for providing one or more applications to a user. More specifically, as illustrated in FIG. 2, the operating system 130 and the browser 126 may be configured to facilitate providing one or more network pages 128a. The network page 128a may be provided by the computing device 104 via the electronic commerce application 112; however this is not a requirement.

As also illustrated in FIG. 2, the network page 128a may include content from the administrator of the network page 128a (e.g., the computing device 104 via the electronic commerce application 112), as well as data from other sources. As a nonlimiting example, one or more third parties may provide advertisement data to the electronic commerce application 112 for providing advertisements 202a, 202b for goods and/or services that may or may not be offered on the network page 128a directly. As these advertisements 202a, 202b may originate from sources of questionable integrity, the advertisements 202a, 202b may include malware that could infect the user system 124.

Also illustrated in the nonlimiting example of FIG. 2 is a positive security icon 132a, which may be provided by the security application 132 (FIG. 1). The positive security icon 132a may be configured to indicate that the user system 124 is currently free of malicious software, such as malware.

Figure 3:
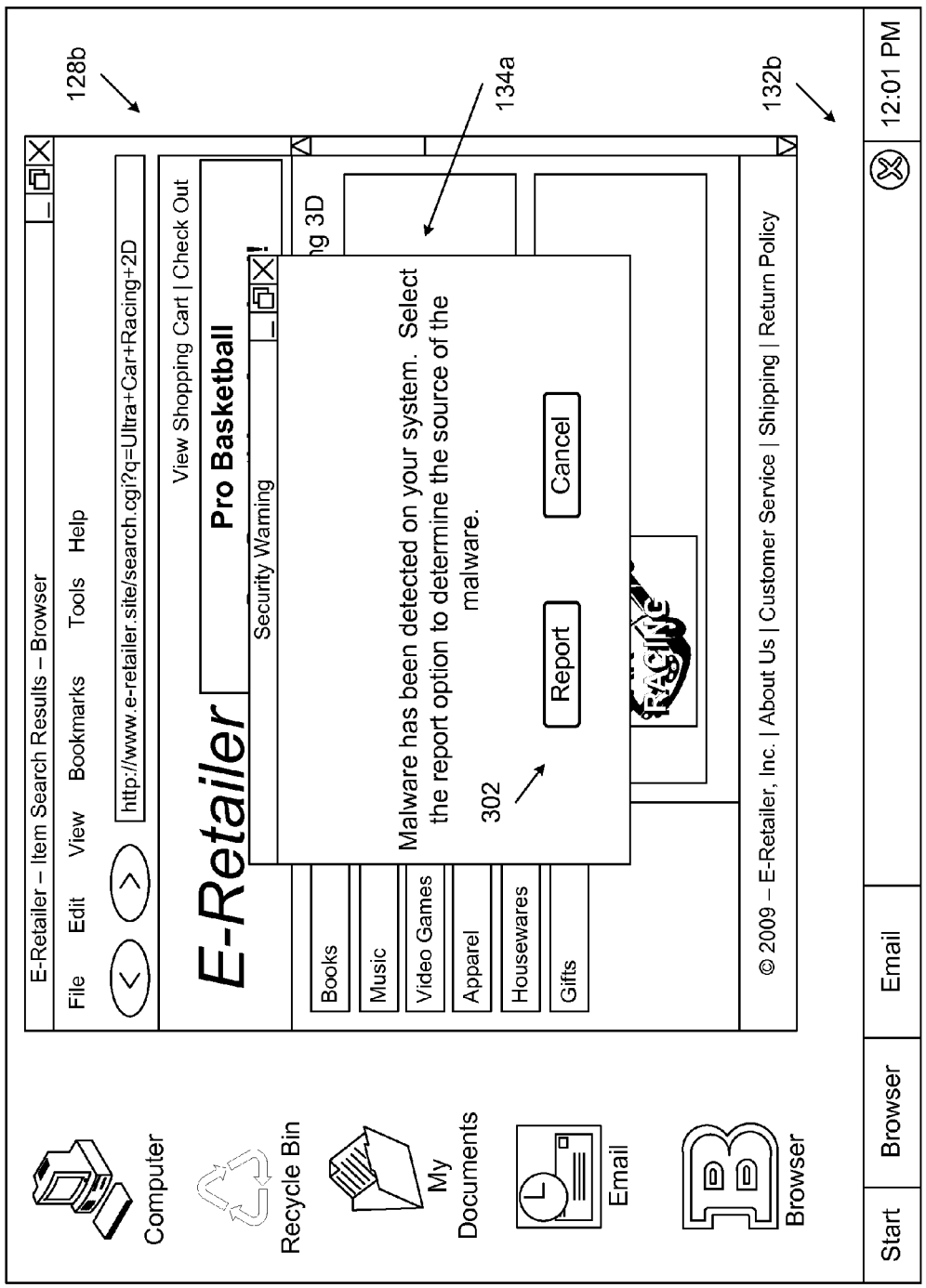
FIG. 3 is a drawing of an example of a user interface rendered by the user system of FIG. 1 via the intrusion application, according to various embodiments of the present disclosure.

FIG. 3 is a drawing of an example of a user interface rendered by the user system 124 (FIG. 1) via the intrusion application 134 (also FIG. 1), according to various embodiments of the present disclosure. As illustrated in the nonlimiting example of FIG. 3, a network page 128b may include an advertisement or otherwise be configured to download malware on the user system 124. Accordingly, the security application 132 may detect the malware and indicate (via a negative security icon 132b) that malware now resides on the user system 124. Additionally, in at least one embodiment, upon detection of the malware on the user system 124, the intrusion application 134 may be configured to provide an interface 134a for reporting the problem to the network intrusion detection application 114. By selecting a report option 302, the intrusion application 134 may communicate with the browser 126 to retrieve browsing data (such as browsing history, types of files that the user encountered, downloads, etc.) around the time (or within a predetermined time period) that the user system 124 detected the malware.

One should note that while in the nonlimiting example of FIG. 3, the user is presented with an option to report the malware (and browsing data) to the network intrusion detection application 114; this is not a requirement. More specifically, in at least one nonlimiting example, upon detection of the malware, the intrusion application 134 may be configured to automatically compile the desired data and automatically send the data to the network intrusion detection application 114. Similarly, some embodiments may periodically or continuously report browsing data, regardless of whether the security application 132 has detected malware. Such embodiments may serve useful in situations where the user system 124 does not have the security application 132 or the security application 132 is unable to detect all potential malware.

Figure 4:
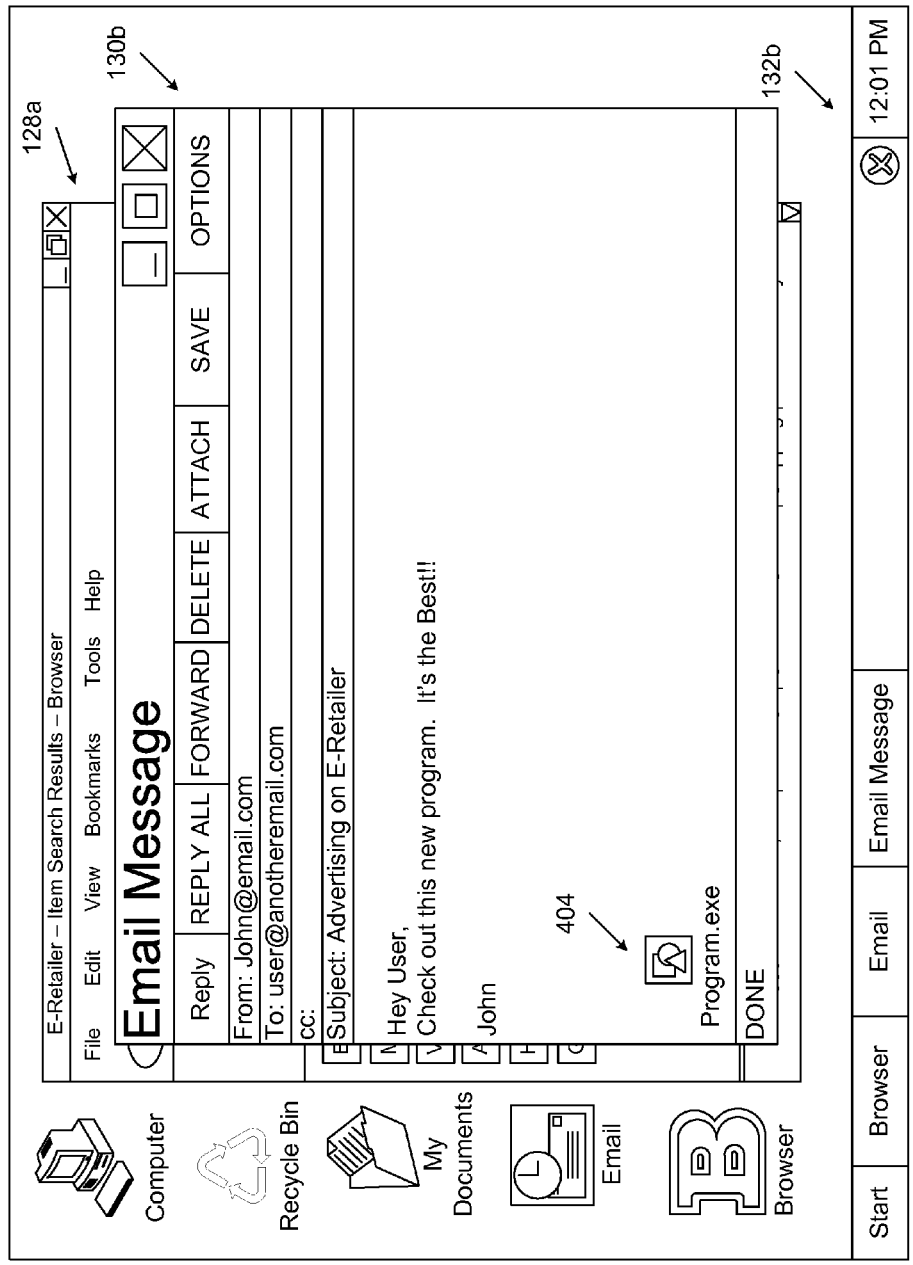
FIG. 4 is a drawing of another example of a user interface rendered by a user system from FIG. 1, according to various embodiments of the present disclosure.

FIG. 4 is a drawing of another example of a user interface rendered by the user system 124 from FIG. 1, according to various embodiments of the present disclosure. As illustrated in the nonlimiting example of FIG. 4, the operating system 130 is providing an email message via an email application, at the same time that the browser 126 is providing the network page 128*a*). Additionally, the security application 132 is detecting malware on the user system 124. In such a scenario, the email message 130*b* may include an attachment of an executable program 404 (and/or other file). Because of this, the detected malware may originate from the network page 128*a* and/or the email message 130*b*. Accordingly, upon detection of the malware by the security application 132, the intrusion application 134 may be configured to retrieve browsing history data and/or other information to for the network intrusion detection application 114 to determine from where the malware originated.

As illustrated in and discussed with reference to FIGS. 2-4, the intrusion application 134 may retrieve browsing data (and/or other data) for sending to the computing device 104. The network intrusion detection application 114 may receive this browsing (and/or other) data, as well as similar data from other user systems 124 and may compare the received data to determine trends in the types of malware detected and the likely sources of the malware. As a nonlimiting example, the computing device 104 may be an online retailer that provided the network pages 128*a* and 128*b* (FIG. 3). The computing device 104 may provide users with the ability to download the intrusion application 134. When malware is detected on the user system 124, the intrusion application 134 can compile the browsing data (and/or other data) and send the compiled data to the computing device 104.

The computing device 104 (via the network intrusion detection application 114) can receive the data from the user system 124 and utilize that data to determine whether the malware originated from an advertiser on the network pages 128*a*, 128*b* (which is provided by the computing device 104). As a nonlimiting example, the computing device 104 may receive browsing data from a plurality of user systems 124. The browsing data may include uniform resource locators (URLs) of websites that the users visited within a predetermined time of detecting the malware on the user system 124. The computing device 104 (via the network intrusion detection application 114) can compare the data from the plurality of user systems 124 to determine if the malware on the plurality of systems is the same and if any of the network pages 128 that the plurality of user systems 124 visited were the same. If there are a number of common URLs, the results may be further refined by determining whether there are file types associated with some of the results but not with others. Similarly, a determination can be made whether the URLs are associated with a geographic region. As certain geographic regions may be notorious for malware, URLs that are associated with those geographic regions may be identified as a likely source of the malware. From this analysis, a determination can be made regarding a likelihood of whether a particular URL is the source of the malware. Similarly, in some embodiments, a threshold may be set such that if the likelihood that a particular URL reaches the threshold, preventative measures may be implemented.

More specifically, if a URL is identified as likely being a source of malware and that URL is related to a network site that is provided by the computing device 104 (e.g., the computing device 104 is providing advertisements 202 from third parties), the computing device 104 can shut down an advertiser network that is providing the URL. Additionally, the computing device 104 can provide a removal tool to remove the malware from the user system 124, as well as indicate the origin of the malware. However, if the URL is not associated with the computing device 104, the computing device 104 can send an indication to the entity that administers the network site associated with the URL that the network site might be disseminating malware.

Figure 5:
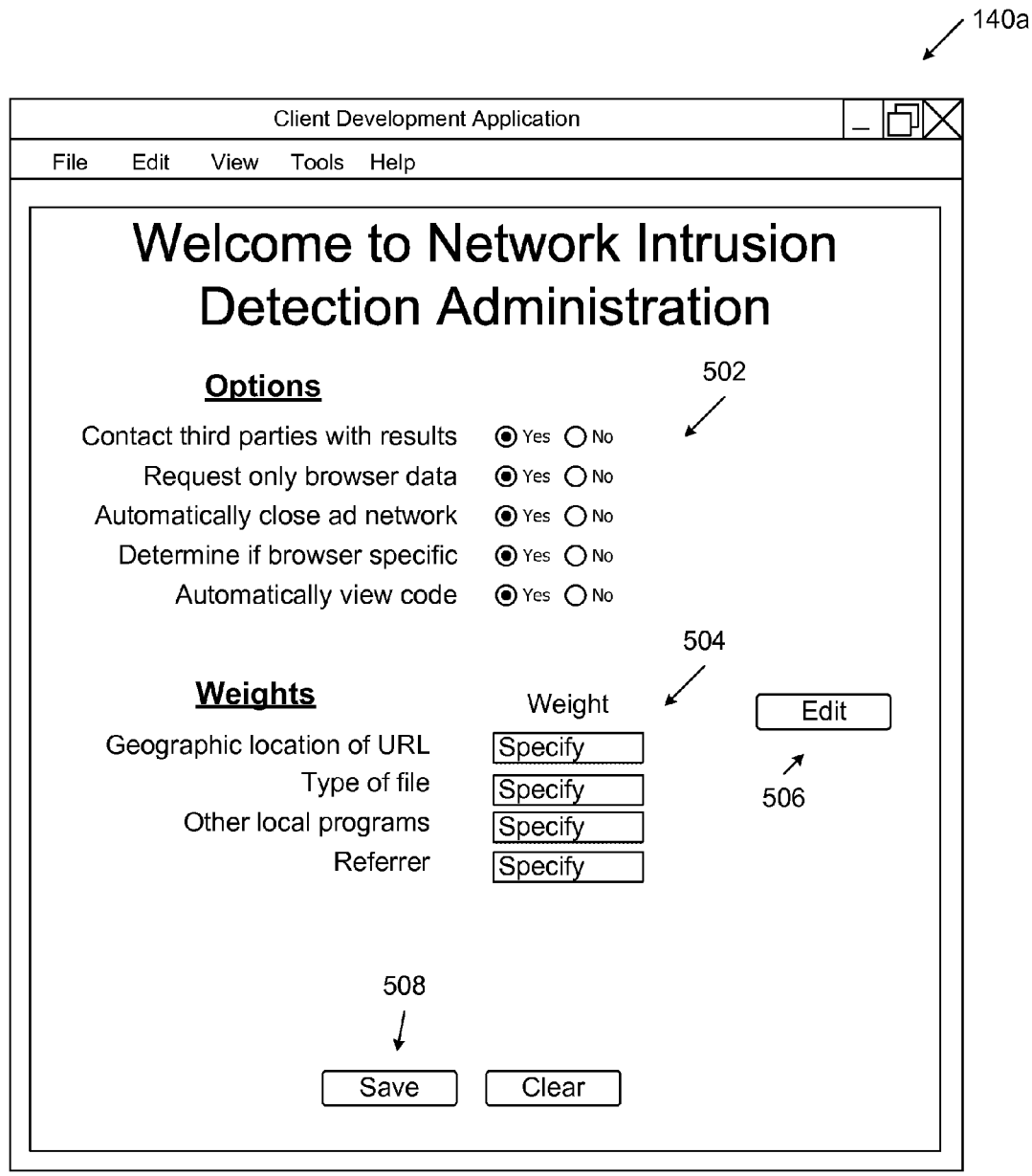
FIG. 5 is a drawing of an example of a user interface rendered by an administrator client from FIG. 1, according to various embodiments of the present disclosure.

FIG. 5 is a drawing of an example of a user interface 140*a* rendered by the administrator client 136 from FIG. 1, according to various embodiments of the present disclosure. As illustrated in the nonlimiting example of FIG. 5, the user interface 140*a* may be provided to an administrator of the online retailer or other entity for configuring operation of the network intrusion detection application 114. In at least one embodiment, one or more options 502 may be provided to customize collection and/or analysis of data received from the user systems 124. The options 502 may include an option to contact third parties with results from the malware analysis, request only browser data, automatically close ad network, determine if the malware is browser specific, and automatically view code.

More specifically, the "contact third parties with results" option may be configured to determine whether the administrator would like to contact a third party if the malware is not originated by the online retailer. If a determination is made that the malware originated from a third party, that third party may be unaware of the malware. Accordingly, the computing device 104 may send an indication to the third party indicating the presence of malware.

Similarly, the "request only browser data" option may relate to whether the analysis of data from the user system 124 includes anything other than browser history and related browsing data. As network resources may be consumed by this data, some embodiments may limit the type of data transmitted and/or analyzed to determine the source of malware.

The "automatically close the ad network" option relates to situations where malware is determined to be associated with the network pages 128 provided by the computing device 104. In such situations, the malware may be received from a third party via an ad network. As the computing device 104 may provide advertisements 202 (FIG. 2) via a plurality of ad networks, the ad network with the malware may be determined and automatically shut down to prevent further dissemination of the malicious code.

The "determine if browser specific" option relates to whether a determination regarding whether the malware is preventable by certain browsers, but not others. As a nonlimiting example, a first browser type may include a security feature that prevents the malware from being downloaded onto the user system 124, while a second browser type may not include this feature. In such embodiments, the intrusion application 134 may analyze the browser type of the user system 124 and determine whether the malware may be prevented by changing (or updating) browsers. If so, an indication of this may be provided to the user system 124.

The "automatically view code" option relates to whether the malware source code is provided to an administrator, once the malware source is discovered. This may allow the administrator to perform further analysis regarding the malware to prevent future occurrences of infection.

Also included in the nonlimiting example of FIG. 5 are "weights" options 504. The weights options 504 may include one or more options for determining what information is relevant to locating the source of malware. As a nonlimiting example, if certain geographic locations are notorious for malware, the geographic location of URL may be weighted heavily. Similarly, if JavaScript applications are often associated with malware, but jpeg files are not, the type of file option may be weighted heavily. Similarly, if local programs are often the source of malware (instead of the network browsing), the local programs option may be heavily weighted. If the referrer of the malware (e.g., if E-retailer is providing an advertisement that includes malware) is known for malware, this weight option may be weighted heavily. Also included is an edit option 506 for editing the weight options (and/or other options), adding new options, and/or removing existing options. The options may be saved by selection of a save option 508.

Figure 6:
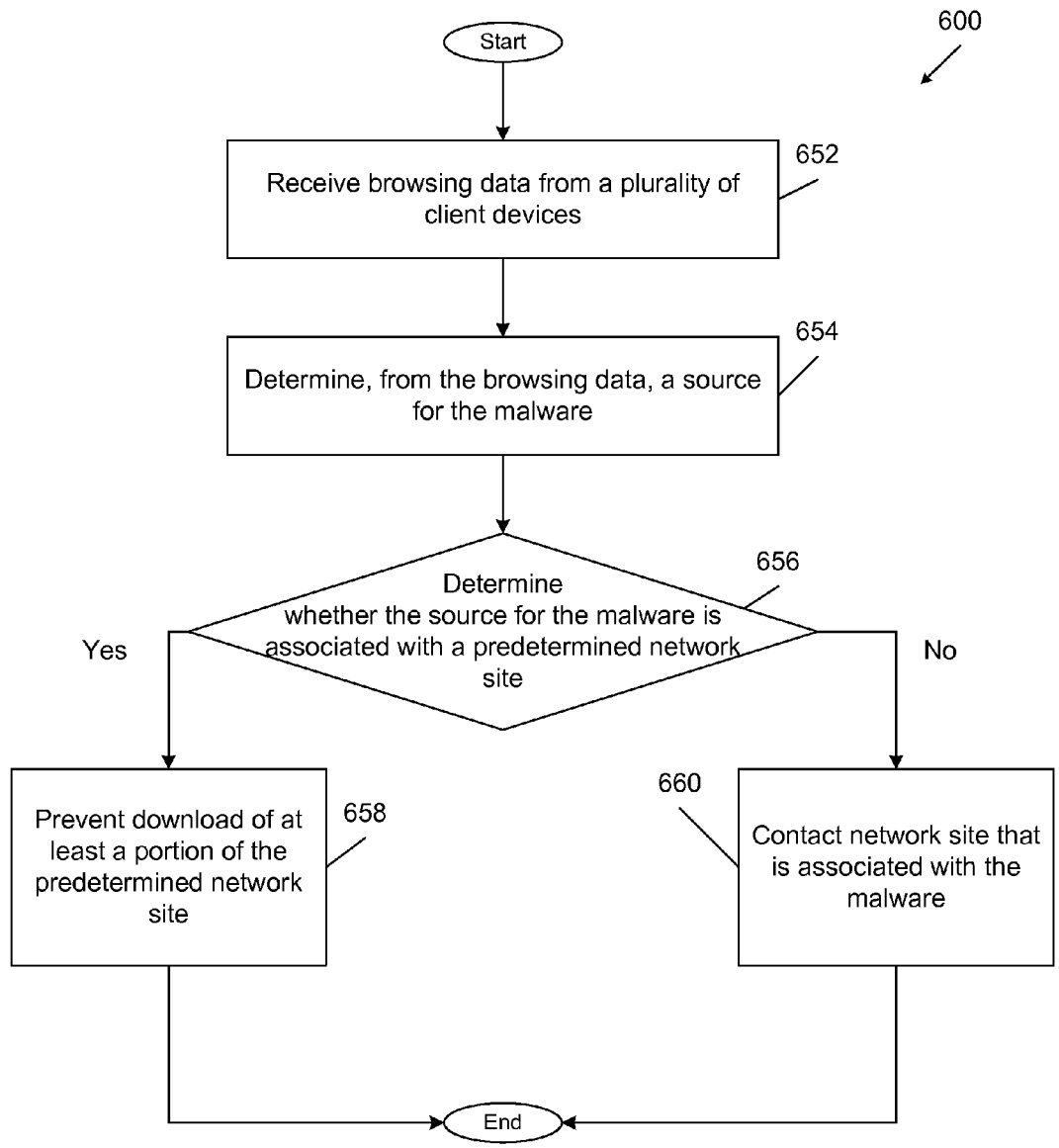
FIG. 6 is a drawing of a process that may be utilized for the computing device from FIG. 1 to determine a source of malware, according to various embodiments of the present disclosure.

Referring next to FIG. 6, shown is a flowchart that provides one example of the operation of a portion of the network intrusion detection application 114 (FIG. 1) according to various embodiments. It is understood that the flowchart of FIG. 6 provides merely an example of the many different types of functional arrangements that may be employed to implement the operation of the portion of the network intrusion detection application 114 as described herein. As an alternative, the flowchart of FIG. 6 may be viewed as depicting an example of steps of a method implemented in the computing device 104 (FIG. 1) according to one or more embodiments.

As illustrated in FIG. 6, in block 652, browsing data may be received from a plurality of client devices. Additionally, at block 654, a determination can be made from the browsing data as to the source of the malware. At block 656, a determination can be made regarding whether the source of the malware is associated with a predetermined network site. If so, at block 658, download of at least a portion of the predetermine network site may be prevented. However, if at block 656, the malware is not associated with the predetermined network site, at block 660, the network site can be contacted to indicate that the network site is providing malware.

Figure 7:
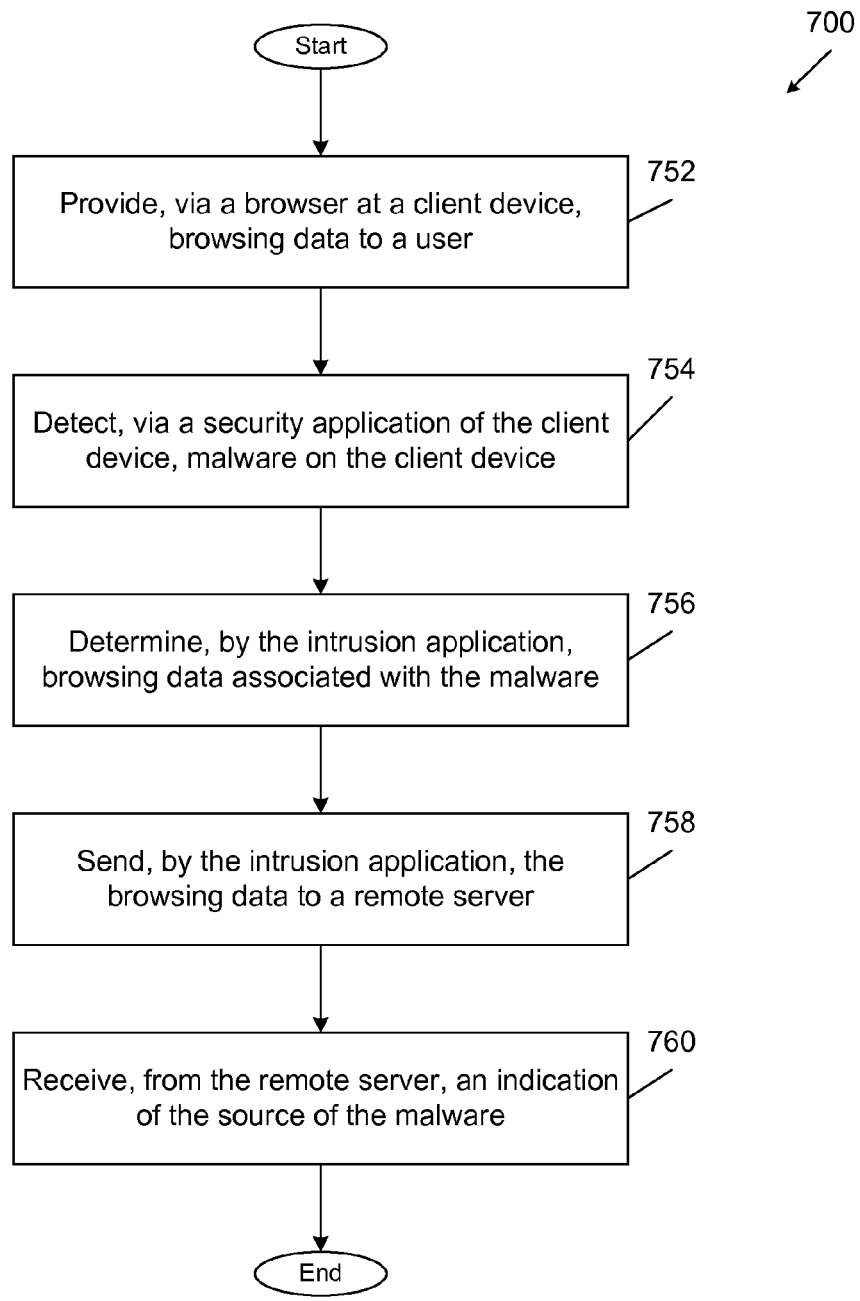
FIG. 7 is a drawing of a process that may be utilized for the user system from FIG. 1 to facilitate a determination of a source of malware, according to various embodiments of the present disclosure.

Referring next to FIG. 7, shown is a flowchart 700 that provides one example of the operation of a portion of the intrusion application 134 (FIG. 1) according to various embodiments. It is understood that the flowchart of FIG. 7 provides merely an example of the many different types of functional arrangements that may be employed to implement the operation of the portion of the intrusion application 134 as described herein. As an alternative, the flowchart of FIG. 7 may be viewed as depicting an example of steps of a method implemented in the user system 124 (FIG. 1) according to one or more embodiments.

More specifically, as illustrated in FIG. 7, browsing data may be provided at block 752 to a user via a browser 126 at a client device (e.g., the user system 124). At block 754, malware may be detected on the client device via the security application 132 on the client device. At block 756, a determination may be made by the intrusion application 134 browsing data that is associated with the malware. At block 758, the browsing data that is associated with the malware may be sent by the intrusion application 134 to a remote server (e.g., the computing device 104). At block 760, the client device may receive, from the remote server, an indication of the source of the malware.

Figure 8:
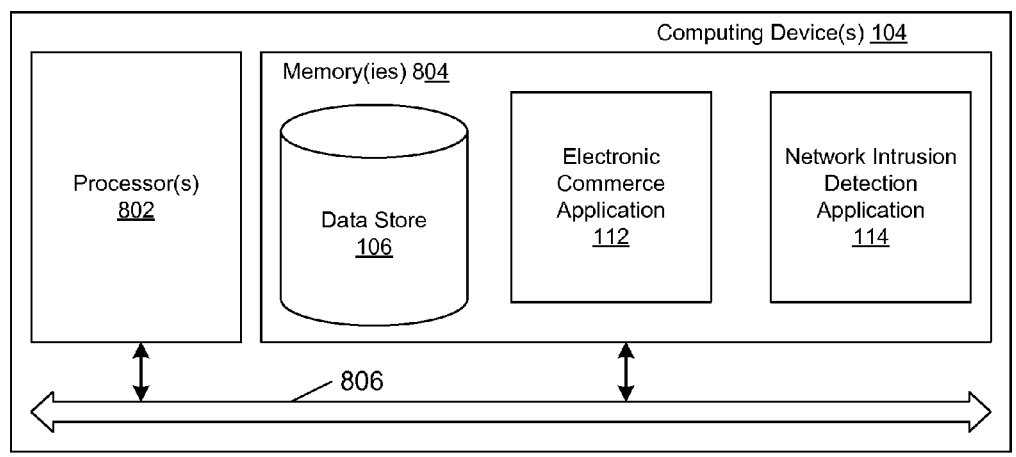
FIG. 8 is a drawing of an example of the computing device of FIG. 1, according to various embodiments of the present disclosure.

With reference to FIG. 8, shown is a schematic block diagram of the computing device 104 according to an embodiment of the present disclosure. The computing device 104 includes at least one processor circuit, for example, having a processor 802 and a memory 804, both of which are coupled to a local interface 806. To this end, the computing device 104 may comprise, for example, at least one server computer or like device. The local interface 806 may comprise, for example, a data bus with an accompanying address/control bus or other bus structure as can be appreciated.

Stored in the memory 804 are both data and several components that are executable by the processor 802. In particular, stored in the memory 804 and executable by the processor 802 are the electronic commerce application 112, the network intrusion detection application 114, and potentially other applications. Also stored in the memory 804 may be a data store 106 and other data. In addition, an operating system 130 may be stored in the memory 804 and executable by the processor 802.

It is understood that there may be other applications that are stored in the memory 804 and are executable by the processors 802 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 804 and are executable by the processor 802. In this respect, the term "executable" means a program file that is in a form that can ultimately be run by the processor 802. Examples of executable programs may be, for example, a compiled program that can be translated into machine code in a format that can be loaded into a random access portion of the memory 804 and run by the processor 802, source code that may be expressed in proper format such as object code that is capable of being loaded into a random access portion of the memory 804 and executed by the processor 802, or source code that may be interpreted by another executable program to generate instructions in a random access portion of the memory 804 to be executed by the processor 802, etc. An executable program may be stored in any portion or component of the memory 804 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 804 is defined herein as including both volatile and nonvolatile memory and data storage components. Volatile components are those that do not retain data values upon loss of power. Nonvolatile components are those that retain data upon a loss of power. Thus, the memory 804 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 802 may represent multiple processors 802 and the memory 804 may represent multiple memories 804 that operate in parallel processing circuits, respectively. In such a case, the local interface 806 may be an appropriate network 102 that facilitates communication between any two of the multiple processors 802, between any processor 802 and any of the memories 804, or between any two of the memories 804, etc. The local interface 806 may comprise additional systems designed to coordinate this communication, including, for example, performing load balancing. The processor 802 may be of electrical or of some other available construction.

Although the network intrusion detection application 114, the intrusion application 134, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6 and 7 show the functionality and operation of an implementation of portions of the network intrusion detection application 114 and the intrusion application 134. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 802 in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network intrusion detection application 114 and the intrusion application 134, that comprises software or code can be embodied in any computer-readable medium for use by or in connection with an instruction execution system such as, for example, a processor 802 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium storing an intrusion application executable in a computing resource, comprising:
    code that communicates with security software to determine whether malware exists on a client device;
    code that receives an indication from the security software of malware on the client device;
    code that, in response to receiving the indication, communicates with a browser on the client device to receive an identifier of a network page that was accessed within a predetermined time before receiving the indication;
    code that encodes for display a user option to facilitate determining the source of the malware;
    code that receives a response to the user option;
    code that, in response to receiving a positive response to the user option, sends the identifier to a remote device, the remote device configured to determine a likelihood that the identifier is associated with the source of the malware;
    code that receives data associated with the source of the malware; and
    code that facilitates removal of the malware from the client device.

2. The transitory computer-readable medium of claim 1, wherein receiving data associated with the source of the malware includes receiving instructions for removing the malware from the client device.

3. The non-transitory computer-readable medium of claim 1, the intrusion application further comprising logic that determines local usage data associated with actions of the client device that were performed within the predetermined time before receiving the indication.

4. A method, comprising steps of:
    receiving, by a computing system, browsing history data from a plurality of client devices, the data being sent by the plurality of client devices in response to a determination of malware on at least one of the plurality of client devices;

automatically determining, by the computing device, from the browsing history data, a source for the malware;

determining whether the source for the malware is associated with a predetermined network site; and in response to determining that the source of the malware is associated with the predetermined network site, preventing download of at least a portion of the predetermined network site.

5. The method of claim 4, further comprising, in response to determining that the source of the malware is not associated with the predetermined network site, notifying an entity associated with the source of the malware.

6. The method of claim 4, wherein the browsing history data is received from a first client device of the plurality of client devices that includes an intrusion application for communicating with a security application that identified presence of the malware on the first client device.

7. The method of claim 4, wherein the browsing history data is received from a second client device of the plurality of client devices that includes an intrusion application for communicating with a browser to compile the browsing history data.

8. The method of claim 4, further comprising receiving local usage data from a third client device of the plurality of client devices, the local usage data relating to usage of the third client device that potentially caused transfer of the malware onto the third client device, the local usage data being different than the browsing history data.

9. The method of claim 4, wherein determining the source of the malware includes comparing uniform resource locators (URLs) received from the plurality of client devices and determining a likelihood that at least one of the URLs identifies the source of the malware.

10. The method of claim 4, wherein determining the source of the malware includes determining a geographic location associated with the browsing history data.

11. A system, comprising:

a computing resource; and a network intrusion detection application executable in the computing resource, the network intrusion detection application comprising:

logic that receives first usage data from a first client device that is infected with malware;

logic that receives second usage data from a second client device that is infected with malware; and logic that compares the first usage data with the second usage data to determine a likely source of the malware.

12. The system of claim 11, wherein the first usage data: is selected from a group consisting of network browsing data, time data, a uniform resource locator (URL), and local usage data.

13. The system of claim 11, wherein the first client device includes a security application and an intrusion application, the security application configured to determine presence of the malware on the first client device, the intrusion application configured to communicate with the security application in response to the security application determining presence of the malware on the first client device.

14. The system of claim 13, wherein receiving the first usage data includes receiving the first usage data from the intrusion application.

15. The system of claim 11, wherein the first client device includes a browser and an intrusion application, the browser configured to facilitate access to a network page and facilitate storage of data related to the network page, the intrusion application configured to, in response to the determination that the malware is present on the first client device, communicate with the browser to access the data related to the network page.

16. The system of claim 11, the network intrusion detection application further comprising logic that determines whether the likely source of the malware is associated with a predetermined entity.

17. The system of claim 16, the network intrusion detection application further comprising logic that, in response to a determination that the source of the malware is not associated with the predetermined entity, contacting an entity associated with the source of the malware.

18. The system of claim 11, the network intrusion detection application further comprising logic that sends indication of the likely source of the malware to at least one of the following: the first client device and the second client device.

19. The system of claim 11, the network intrusion detection application further comprising logic that determines a geographic location associated with the usage data.

20. The system of claim 11, the network intrusion detection application further comprising logic that determines a file type associated with the usage data.

* * * * *

UNITED STATES PATENT AND TRADEMARK OFFICE
CERTIFICATE OF CORRECTION

| | |
|---|---|
| PATENT NO. | : 8,364,811 B1 |
| APPLICATION NO. | : 12/827478 |
| DATED | : January 29, 2013 |
| INVENTOR(S) | : David Erdmann, Karl A. McCabe and Jon A. McClintock |

It is certified that error appears in the above-identified patent and that said Letters Patent is hereby corrected as shown below:

At column 11, line 4, delete "device" and replace with --system--.

Signed and Sealed this
Twenty-sixth Day of March, 2013

Teresa Stanek Rea
*Acting Director of the United States Patent and Trademark Office*